Dec. 5, 1950     R. M. BUCKERIDGE     2,532,287
SPEED CONTROL SYSTEM
Filed June 22, 1948
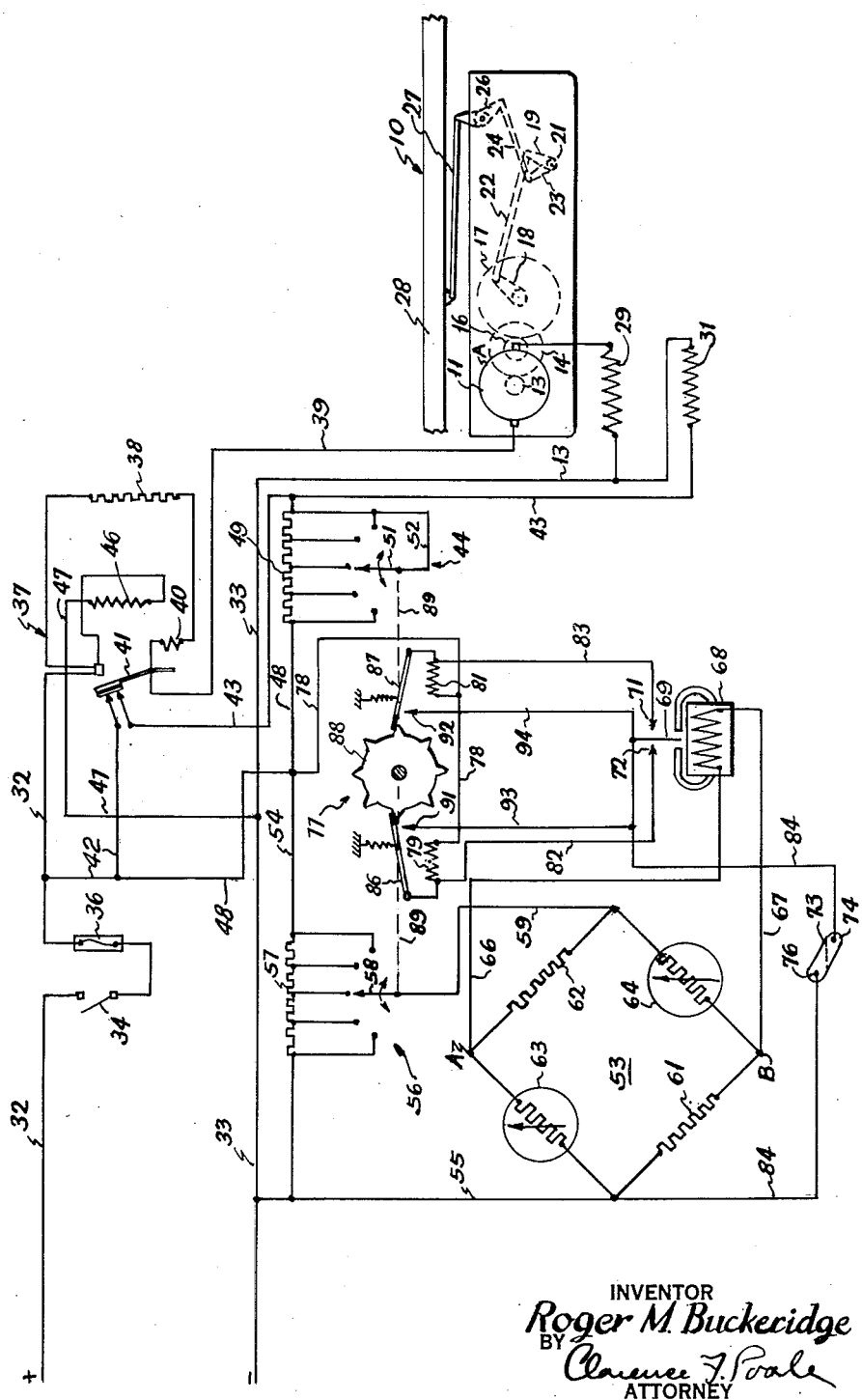
INVENTOR
*Roger M. Buckeridge*
BY
*Clarence J. Poole*
ATTORNEY Patented Dec. 5, 1950

2,532,287

UNITED STATES PATENT OFFICE 2,532,287

SPEED CONTROL SYSTEM

Roger M. Buckeridge, Chicago, Ill., assignor to Goodman Manufacturing Company, Chicago, Ill., a corporation of Illinois Application June 22, 1948, Serial No. 34,440

9 Claims. (Cl. 318—306)

This invention relates to speed control systems and has particular reference to a system for maintaining the speed of a motor at a constant value.

In driving certain kinds of machinery, as for example a shaker conveyor in a coal mine, rotating electrical machines are commonly used. Such shaker conveyors should be operated at a substantially constant frequency since if the frequency of the trough pans is too low the material conveyed will not move efficiently therealong. If the frequency is too high, the acceleration stresses induced in such conveyors are apt to greatly diminish the useful life thereof. Since the line voltages in a mine fluctuate greatly because of the heavy duty electrical machinery intermittently operating thereon, the problem of maintaining constant speed of motors driving such shaker conveyors is extremely difficult.

As is known, the speed of a direct current motor obeys the following expression:

$$N = \frac{E - IR}{\phi Z}$$

where,

N = speed in R. P. M.
E = impressed voltage
I = armature current
R = armature resistance
$\phi$ = field flux
Z = constant for a given machine If the IR effect is ignored, the first degree of approximation is:

$$N = K \frac{E}{\phi}$$

in which K is a constant for a given machine. Accordingly, if the field flux $\phi$ is varied by varying the current in the shunt field of such a machine so that the field flux changes in the same proportion as the voltage E changes, the speed N remains substantially a constant. This cannot be done by changing the voltage on the field or the current in the field in the same proportion as the line voltage changes because the field flux depends upon the degree of saturation of the iron in the field structure. However, any particular value of field flux, within limits, can be secured by varying the voltage impressed on the field and hence the current through the field.

With the foregoing considerations in mind it is an object of the present invention to enable a motor to be operated at constant speed, a novel form of bridge circuit being employed which will balance for a particular line voltage and which upon unbalance and the operation of a switch controlled by the rotating machine or the mechanism driven thereby enables the voltage across the field flux of the electrical machine to be held at such a value as will produce constant speed of the machine.

Another object is to enable the speed of a rotating electrical machine to be held at a constant regardless of line voltage, the constant speed being achieved by the adjustment of a resistance in the field circuit of the machine, the adjustment of the resistance being accomplished by a directional stepping relay controlled in its operation by a bridge connected in the supply line and adjusted to balance at a desired voltage.

Still another object comprehends the provision of a novel bridge circuit for maintaining a rotating machine at constant speed, such a bridge including current arms each preferably composed of a common type of resistance and of a semi-conductor having a large negative temperature coefficient of resistance, and so arranged that the bridge will not balance when voltages are impressed thereacross at values greater or less than a desired value, such unbalance of the bridge causing a polar relay to energize and in turn energize a stepping relay which in turn rebalances the bridge and adjusts the voltage across the field of the rotating machine to a proper value.

Another object is to enable a rotating electrical machine to be operated at constant speed by maintaining the field flux at the proper value regardless of the line voltage, the proper value being determined by a bridge sensitive to variation in the line voltage to initiate the operation of a stepping relay pulsed by the movement of a driven machine, the pulsing or operation of the stepping relay readjusting the bridge to a null or balance point and simultaneously adjusting the voltage across the field.

Since the current demand of an electric motor may vary widely in operating a reciprocating machine, in controlling the speed of a motor operating such a machine, it is important that the voltage or other controlling effect be measured at the same point in the cycle of the reciprocating machine so that an average overall voltage reading is obtained. It is, then, another object to enable a switch to be operated intermittently at the same point of the cycle of the machine, the operation of the switch and the unbalance of the bridge being employed to pulse a circuit to adjust the voltage on the motor field to control the speed thereof.

Other objects and advantages of the present invention will be apparent from a study of the description hereinafter taken together with the drawing which illustrates a preferred embodiment of the invention. While the invention is described with reference to a preferred embodiment thereof, its scope is not intended to be limited in terms of said embodiment nor otherwise except by the terms of the claims subjoined.

Referring now to the drawing, the speed control system according to the present invention is shown as applied to a shaker conveyor shown at 10. The shaker conveyor 10 is driven by an electric motor 11 which is connected through a gear train indicated schematically and consisting of gears 13, 14, 16 and 17. The gear 17 drives a crank 18 which is adapted to move a rocker arm 19 mounted on a shaft 21, through the medium of a connecting rod 22. The shaft 21 has fast thereto a second rocker arm 23 connected by a link 24 to a bell crank 26 which is connected by a link 27 to a pan line 28 of the shaker conveyor 10. It will be evident that upon rotation of the motor 11 that reciprocatory movement will be imparted to the pan line 28 of the shaker conveyor 10.

The motor 11 is of the compound type and includes a winding or field 29 in series with the armature thereof and a shunt winding 31 or field across the armature thereof.

A supply line 32, 33 at varying voltage is connected to the motor 11 through a switch 34, a fuse 36 and a motor-starter indicated generally at 37. The starter 37, which may be of any conventional design, includes a resistance 38 connected in series through a conductor 39 with the series field 29 and the armature of the motor 11 to maintain the current through the armature at a safe value while starting.

The starter 37 is designed to impress full line voltage across the shunt field 31 during the starting cycle, the voltage across the shunt field being thereafter varied at a predetermined rate depending on the voltage across the supply line 32, 33 by means as will be later described. The starter 37 includes a winding 40 which holds a current carrying armature 41 in position to close a circuit through the shunt field 31 at full line voltage, such a circuit including conductors 42, 43 and the return conductor 33.

The starter 37 is adapted to open the circuit through the conductors 42 and 43 when the motor 11 is operating at proper speed and to short out the starting resistance 38 and to introduce an adjustable rheostat 44 into series with the shunt field 31. To this end the starter 37 is provided with a winding 46 which is connected across the line 32, 33 through a conductor 47 and adapted to oppose the force of the winding 40 in holding the armature 41 in the position shown in the drawing. When the starting current through the winding drops off as the motor 11 attains speed, the holding effect of the winding 40 is lessened and the effect of the winding 46 will be to move the armature 41 to position shorting out the starting resistance 38 at the same time placing the adjustable rheostat 44 in circuit with the shunt field 31. At this time the circuit through the shunt field will be through a conductor 48 branching from the line 42, a tapped resistance 49 of the adjustable rheostat 44, an adjustable pick-off arm 51, a conductor 52 and the conductor 43, the shunt field 31 and the return conductor 33. It will be evident from the foregoing that upon starting, the variable rheostat 44 will be shunted out to provide full starting voltage across the shunt field 31, and that thereafter the shunt field 31 will be in series with the rheostat 44 so that the voltage across the field 31 may be varied at a predetermined value to maintain the speed of the motor 11 at a constant.

Means are provided for adjusting the position of the arm 51 according to the voltage across the supply line 32, 33 so that the voltage across the shunt field will be of a proper value dependent on the line voltage. To this end there is provided a novel control bridge balanced at a particular line voltage and which becomes unbalanced at any other line voltage impressed thereacross to develop a current for operating a polar relay controlling two parallel circuits which are pulsed intermittently to operate relays which will move a voltage divider to position whereby the bridge is rebalanced and whereby the rheostat will be adjusted to provide for the proper voltage across the shunt field according to the change in the line voltage. As shown in the drawing there is provided a bridge 53 connected to provide a circuit through a conductor 54 branching from the conductor 48, a voltage divider 56 including a tapped resistance 57 and an adjustable current carrying arm 58 connected to a conductor 59 to one end of the bridge 53. The circuit including the bridge 53 is completed through a conductor 55 to the other side of side 33 of the supply line.

The bridge 53 includes resistance elements 61 and 62, and thermistors 63 and 64 which are semiconductors having highly non-linear negative temperature coefficients of resistance. That is to say, the resistance is high when the semi-conductors 63 and 64 are cold and low when hot. This phenomenon is in contrast to metals which in general have small positive temperature coefficients of resistance, the resistance of metals increasing as the temperature of the metal increases. Uranium oxide, nickel manganese oxide and silver sulfide are examples of such semi-conductors. The bridge 53 is designed to balance for a certain line voltage so that there is no difference in potential at points A and B of the bridge 53. It will be evident that if the voltage across the bridge 53 is increased, the thermistor 63 will be heated because of the increased current passing therethrough which results in an increased $I^2R$ or increased heating effect. Since the thermistor 63 decreases in resistance upon heating, the voltage drop in the bridge arm containing thermistor 64 will not be as great as the voltage drop in the bridge arm containing the resistor 62 thereby resulting in a voltage differential between points A and B. Likewise, if the voltage across the bridge 53 is decreased the thermistor 63 will be cooled because of the decrease of the $I^2R$ value therein, and the resistance of the thermistor 63 increased. Obviously, the resistance of the resistor 61 will remain a substantial constant, thus giving rise to a voltage differential between points A and B but of a different sense than in the other example.

The thermistors 63 and 64 have been shown as of the directly heated type but it will be evident that they may also be of the indirectly heated type using a heating coil receiving current from the supply line 32, 33.

Points A and B are adapted to be connected by conductors 66 and 67 through a polar relay 68 having a current carrying armature 69 adapted to close on contact points 71 or 72 according to the sense of the current developed upon unbalance of the bridge 53. The current carrying armature 69 is in circuit with an intermittently operated switch 73 which is preferably operated by the movement of the pan line 28 but which may be operated intermittently by any convenient means. The switch 73 is shown as a mercury switch which will close the circuit between contacts 74 and 76 because of the inertia of the mercury therein as the switch 73 operates intermittently. It should be noted that any intermittently operated switch can be employed and that its operation may be derived from any reciprocating or rotating motion.

The current carrying armature 69, which is in circuit with the intermittently operated switch 73, is part of a circuit adapted to give a pulse of current to a directional stepping relay indicated at 77. Upon the closing of the switch 73 and the energization of the polar relay 68 a circuit is made through conductor 48, branching conductor 78, and through either winding 79 or 81 of the directional stepping relay 77 according to whether the armature 69 is closed on contact 72 or 71. The circuit is completed through the windings 79 or 81 of the directional stepping relay 77 through conductors 82 or 83, and a conductor 84 having the switch 73 therein connected to the left side of the bridge 53.

Relay windings 79 and 81 are adapted to cooperate respectively with armatures 86 and 87, the ends of which are in engagement with a stepper (wheel) 88 mounted on a shaft 89, which upon rotation is adapted to adjust the position of the wiper arm 51 of the adjustable rheostat 44 and the wiper arm 58 of the voltage divider 56. In order that the polar relay armature 69 is not required to open circuits containing relatively large currents therein, and in order to provide a polar relay which is sensitive to small amounts of current developed by unbalance of the bridge 53, the stepping relay 77 has cooperating with the armatures 86 and 87 thereof contact points 91 and 92 which are connected to conductors 93 and 94 to form a parallel circuit with the conductors 82 and 83, and which operate to hold windings 79 or 81 in energized condition as long as switch 73 remains closed. Since the circuit consisting of the conductor 78, windings 79 or 81, conductors 82 or 83 and the conductor 84 is broken by the intermittent operation of the switch 73 it will be evident that the circuit just described will be energized by each closing of the switch 73 and that the windings 79 or 81 of the stepping relay 77 will be energized to rotate the stepper (wheel) 88 one point clockwise or counterclockwise depending upon whether the voltage across the bridge 53 is higher than a particular value or lower than a particular value. If the stepping relay 77 is thus actuated by the armature 86 or 87 such operation will cause the arm 58 of the voltage divider 56 to move to a new position so that the arbitrarily selected balancing voltage is once more impressed across the bridge 53, which result may be effected in one operation of the stepping relay 77 or which may require a number of such operations before the rebalance of the bridge 53 is accomplished.

It will be evident, also that the operation of the stepping relay 77 will cause the wiper arm 51 to take a new position on the adjustable rheostat 44, thus increasing or decreasing the amount of the resistance 49 in series with the shunt field 31, to the end that the voltage across the shunt field 31 will be adjusted to a proper value and the speed of the motor 11 maintained at a constant.

The speed control which has been described is extremely simple of operation and maintenance. With the system and control according to the present invention it is possible to operate an electrical machine at substantially constant speed irrespective of the line voltage placed thereon. The bridge circuit forming a part of the invention which provides a differential voltage according to the changes in line voltage is extremely sensitive and cooperates with the sensitive polar relay which functions with the stepping relay to provide an extremely sensitive means for adjusting the voltage on the motor field to insure a constant speed thereof.

While the invention has been described with reference to a preferred embodiment thereof, its scope is not intended to be limited by the description herein nor otherwise except by the claims here appended.

I claim as my invention:

1. In a speed control for a rotating electrical machine having a field and a supply line at variable voltage supplying power to said rotating machine, a circuit having a bridge therein having said line voltage impressed thereacross and balanced for a particular line voltage, said bridge having current carrying arms including a resistance element therein having a negative temperature coefficient of resistance, a polarized relay adapted to operate when said bridge is unbalanced, a switch adapted to be operated intermittently, a stepping relay adapted to be operated by the operation of said switch and said polar relay, a voltage divider in circuit with said bridge circuit adapted to be operated by said stepping relay to rebalance said bridge, and a rheostat adapted to be operated by said stepping relay for maintaining the proper voltage across the field of said rotating machine to produce constant speed irrespective of the line voltage.

2. In a speed control for a rotating electrical machine having a field and a supply line at variable voltage supplying power to said rotating machine, a circuit having a bridge therein having said line voltage impressed thereacross and balanced for a particular line voltage, said bridge having current carrying arms including a resistance element therein having a negative temperature coefficient of resistance, circuit means including a relay energized upon unbalance of said bridge, and a second circuit including an intermittently operated switch, said circuit receiving an impulse upon operation of said intermittently operated switch, means operable upon pulsing of the second circuit to rebalance said bridge, and additional means operable upon pulsing of the second circuit to maintain the proper voltage across said field to product constant speed irrespective of the supply line voltage.

3. In a speed control for a rotating electrical machine having a field and a supply line at variable voltage supplying power to said rotating machine, a bridge having said line voltage impressed thereacross and balanced for a particular line voltage, said bridge having current carrying arms including a resistance element therein having a negative temperature coefficient of resistance, circuit means including a relay having an armature movable according to sense of the current developed upon unbalance of said bridge, and a second circuit including an intermittently operated switch, said circuit receiving an impulse upon operation of said intermittently operated switch, means operable upon pulsing of the second circuit to rebalance said bridge, and additional means operable upon pulsing of the second circuit to maintain the proper voltage across said field to produce constant speed irrespective of the supply line voltage.

4. In a speed control for a rotating electrical machine having a field and a supply line at variable voltage supplying power to said rotating machine, a bridge having said line voltage impressed thereacross and balanced for a particular line voltage, said bridge having current carrying arms including a resistance element therein having a negative temperature coefficient of resistance, circuit means including a relay having an armature movable according to sense of the current developed upon unbalance of said bridge, and a second circuit including an intermittently operated switch, said circuit including a relay pulsed by the operation of said switch, means operable upon the pulsing of the second circuit to rebalance said bridge, and means operable in conjunction with said last named means to maintain the proper voltage across said field to produce constant speed irrespective of the supply line voltage.

5. In a speed control for a rotating electrical machine having a field and a supply line at variable voltage supplying power to said rotating machine, a circuit having a bridge therein having said line voltage impressed thereacross and balanced for a particular line voltage, said bridge having current carrying arms including a resistance element therein having a negative temperature coefficient of resistance, circuit means including a relay having an armature movable according to sense of the current developed upon unbalance of said bridge, and a second circuit including an intermittently operated switch, said circuit including a relay pulsed by the operation of said switch, means operable upon the pulsing of the second circuit to rebalance said bridge, and additional means operable upon pulsing of the second circuit to maintain the proper voltage across said field to produce constant speed irrespective of the supply line voltage.

6. In a speed control for an electrical machine having a field and a supply line at variable voltage for supplying electrical energy to said machine, a circuit including a bridge across which said line voltage is impressed, said bridge being adapted to balance at a particular line voltage and including a resistance element whose resistance varies inversely with the temperature of said element, and a resistance element whose resistance varies directly with the temperature of said element, circuit means associated with said bridge and operable upon unbalance of said bridge including a polarized relay responsively operable according to the current sense developed by the differential of potential created upon unbalance of said bridge, a second circuit energized and deenergized by an intermittently operated switch including a relay pulsed in response to the operation of said switch, means associated with said second circuit and including said polarized relay for rebalancing said bridge upon energization of said second circuit, and additional means operated by said second circuit for regulating the line voltage supplied to said field winding for controlling the speed of rotation of said machine.

7. In a speed control device for maintaining uniform speed of a rotating electrical machine having a field winding and a supply line supplying varying voltages to said machine, a circuit including a bridge across which said supply line voltage is impressed, said bridge being adapted to balance at a particular value of line voltage and including a pair of current carrying arms each containing a resistance element whose resistance is inversely proportional to the temperature of said element, circuit means associated with said bridge including a relay with an armature responsively operable according to the sense of the current developed at unbalance of said bridge, a second circuit associated with said first circuit, energized or deenergized by an intermittently operated switch and including a relay pulsed in response to the operation of said switch, a voltage divider operated by said second circuit relay for rebalancing said bridge, and an adjustable rheostat actuated by said second circuit relay for regulating the voltage across said field winding whereby the speed of said machine is maintained at a constant value irrespective of the variations of said line voltage.

8. In a speed control system for an electrical machine having a field and a supply line at variable voltage supplying power to said machine, a circuit having a bridge therein with said line voltage impressed thereacross and balanced for a particular line voltage, said bridge having a resistance element therein having negative temperature coefficient of resistance, a circuit including a relay having an armature movable in a direction according to the sense of the current developed upon unbalance of said bridge, a circuit including an intermittently operated switch and a relay pulsed in accordance with the operation of said switch and the first said relay, and means operable upon pulsing of said second named relay to rebalance said bridge and to maintain the proper voltage across said field to produce constant speed irrespective of the supply line voltage.

9. In a speed control system for an electrical machine having a field and a supply line at variable voltage supplying power to said machine, a circuit having a bridge therein with said line voltage impressed thereacross and balanced for a particular line voltage, said bridge having a resistance element therein having negative temperature coefficient of resistance, means including a circuit having an armature therein movable in a direction according to the sense of the current developed upon unbalance of said bridge, a circuit including an intermittently operated switch and a relay pulsed in accordance with the operation of said switch and the first said means, and means operable upon pulsing of said relay to rebalance said bridge and to maintain the proper voltage across said field to produce constant speed irrespective of the supply line voltage.

ROGER M. BUCKERIDGE.

REFERENCES CITED

The following references are of record in the file of this patent:

UNITED STATES PATENTS

| Number | Name | Date |
|---|---|---|
| 854,121 | Storer | May 21, 1907 |
| 1,142,858 | Tatum | June 15, 1915 |
| 1,947,712 | Grosswege | Feb. 20, 1934 |
| 2,373,208 | Trucksess | Apr. 10, 1945 |